United States Patent
Huang et al.

(10) Patent No.: US 9,601,938 B2
(45) Date of Patent: Mar. 21, 2017

(54) BATTERY CHARGER FOR DIFFERENT POWER SOURCES

(71) Applicant: INTEL CORPORATION, Santa Clara, CA (US)

(72) Inventors: Lilly Huang, Portland, OR (US); Yang-Lin Chen, Taipei (TW); Vaibhav Vaidya, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/278,813

(22) Filed: May 15, 2014

(65) Prior Publication Data

US 2015/0333553 A1    Nov. 19, 2015

(51) Int. Cl.
H02J 7/00    (2006.01)
H01M 10/46  (2006.01)
H02J 1/10    (2006.01)

(52) U.S. Cl.
CPC ............ *H02J 7/0055* (2013.01); *H02J 7/007* (2013.01); *H02J 7/0068* (2013.01)

(58) Field of Classification Search
CPC ....................................................... H02J 7/35
USPC ....................................................... 320/101
See application file for complete search history.

(56) References Cited

U.S. PATENT DOCUMENTS

| | | | |
|---|---|---|---|
| 5,640,076 A | 6/1997 | Youn | |
| 7,023,180 B2 | 4/2006 | Nagai et al. | |
| 7,425,815 B2 | 9/2008 | Wong et al. | |
| 7,432,685 B2 | 10/2008 | Hayashi | |
| 7,514,900 B2 | 4/2009 | Sander et al. | |
| 7,560,829 B2 | 7/2009 | Proefrock et al. | |
| 7,615,965 B2 | 11/2009 | Popescu-Stanesti et al. | |
| 7,622,898 B2 | 11/2009 | Shimizu et al. | |
| 7,698,575 B2 | 4/2010 | Samson | |
| 7,759,906 B2 | 7/2010 | Ferguson | |
| 7,790,307 B2 | 9/2010 | Kim | |
| 7,839,025 B2* | 11/2010 | Besser | H02J 7/0068 307/99 |
| 7,893,657 B2 | 2/2011 | Chavakula | |
| 8,339,105 B2 | 12/2012 | Maleyran et al. | |
| 8,368,345 B2 | 2/2013 | Wahlqvist et al. | |
| 8,450,980 B2 | 5/2013 | Kumar et al. | |
| 8,482,260 B2 | 7/2013 | Hsieh et al. | |
| 8,581,550 B2 | 11/2013 | Lin et al. | |
| 8,587,251 B2 | 11/2013 | Nakashima et al. | |
| 2004/0164704 A1 | 8/2004 | Yang | |

(Continued)

FOREIGN PATENT DOCUMENTS

EP    2 437 374    4/2012
JP    2002-084756    3/2002

(Continued)

OTHER PUBLICATIONS

International Search Report and Written Opinion for PCT/US2013/060394 dated Dec. 27, 2013.

(Continued)

*Primary Examiner* — Edward Tso
*Assistant Examiner* — Ahmed Omar
(74) *Attorney, Agent, or Firm* — KED & Associates LLP

(57) ABSTRACT

A charger may determine a type of power source to couple to the charger, and to adjust power from the power source based on the determined type of the power source.

13 Claims, 8 Drawing Sheets

(56) References Cited

U.S. PATENT DOCUMENTS

| | | |
|---|---|---|
| 2005/0040785 A1 | 2/2005 | Barnes et al. |
| 2006/0256989 A1 | 11/2006 | Olsen et al. |
| 2009/0179495 A1 | 7/2009 | Yeh |
| 2009/0212222 A1 | 8/2009 | Kito et al. |
| 2011/0062913 A1 | 3/2011 | Lin et al. |
| 2011/0109261 A1 | 5/2011 | Chavakula |
| 2011/0138197 A1 | 6/2011 | Lakshmanan et al. |
| 2012/0021807 A1 | 1/2012 | Book et al. |
| 2012/0091968 A1 | 4/2012 | Heo et al. |
| 2012/0187897 A1* | 7/2012 | Lenk .............. H01M 10/44 320/101 |
| 2012/0197341 A1 | 8/2012 | Cowley et al. |
| 2012/0280648 A1 | 11/2012 | Hwang et al. |
| 2013/0290743 A1* | 10/2013 | Lee .................. G06F 1/263 713/300 |
| 2014/0001849 A1 | 1/2014 | Huang et al. |
| 2014/0183974 A1 | 7/2014 | Proefrock et al. |
| 2014/0184137 A1 | 7/2014 | Huang et al. |
| 2014/0184160 A1 | 7/2014 | Huang et al. |

FOREIGN PATENT DOCUMENTS

| | | |
|---|---|---|
| JP | 2005-117768 | 4/2005 |
| JP | 2005-215983 | 8/2005 |
| JP | 3148817 | 3/2009 |
| KR | 10-2007-0109569 | 11/2007 |
| KR | 10-1170079 | 7/2012 |

OTHER PUBLICATIONS

International Search Report and Written Opinion for PCT/US2013/061723 dated Jan. 21, 2014.
U.S. Office Action for U.S. Appl. No. 13/538,265 dated Sep. 22, 2014.
International Search Report for Application PCT/US2015/025156 dated Jul. 15, 2015.
Written Opinion for Application PCT/US2015/025156 dated Jul. 15, 2015.

* cited by examiner

BATTERY CHARGER FOR DIFFERENT POWER SOURCES

BACKGROUND

1. Field

Embodiments may relate to a battery charger of an electronic device

2. Background

Power availability and battery life are factors that may impact a user's experience with an electronic device, such as a mobile terminal. The electronic device may be powered by a direct current (DC) power source or alternatively an alternative power source (or alternative energy source).

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

An electronic device (such as a mobile device) may utilize a power source (or power supply) in order to power the electronic device. The power source may be a direct current (DC) power source, an alternating current (AC) power source or an alternative power source (or alternative energy source), for example. Other types of power sources may also be provided. The following description may relate to an electronic device; however, the description may also relate to an electronic system.

An electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), and/or etc.

Figure 1:
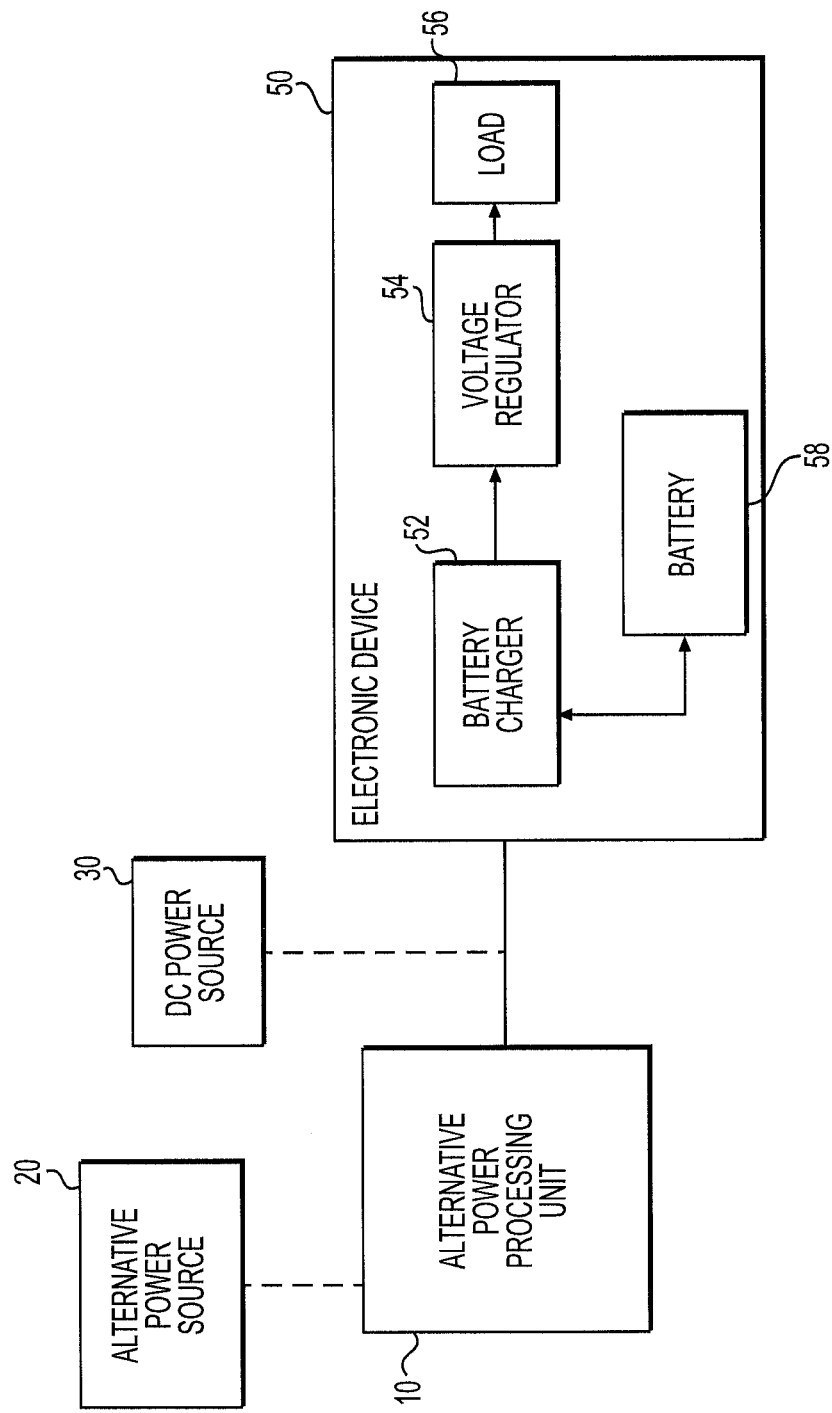
FIG. 1 is a diagram of a charging system and an electronic device according to an example arrangement.

FIG. 1 shows a charging system and an electronic device according to an example arrangement. Other arrangements may also be provided.

More specifically, FIG. 1 shows a first arrangement in which an electronic device 50 may be powered by an alternative power source 20. FIG. 1 also shows a second arrangement in which an electronic device 50 may be powered by a DC power source 30. The electronic device may be different depending on the type of power source used to power the electronic device. In other words, electrical devices may be powered by specific types of power sources.

An alternative power processing unit 10 (or function block of impedance matching and voltage regulation) may be used when the electronic device 50 is to be powered by the alternative power source 20. In the alternative, the DC power source 30 may be directly coupled to the electronic device 50 (without using the alternative power processing unit) to provide a DC voltage (or power).

FIG. 1 shows the alternative power processing unit 10 as being external to the electronic device 50. However, the alternative power processing unit 10 may be part of the electronic device 50 (i.e., internal).

The alternative power source 20 may be any one of a solar energy source, a mechanical energy source (such as via wind), a photovoltaic (PV) energy source, a thermal energy source, a radio frequency (RF) energy source, a vibration energy source, a biomechanical energy source, a fuel cell and/or any other power source.

The alternative power source 20 may provide power (or energy) to the alternative power processing unit 10. As one example, the alternative power source 20 may provide an input power (or input energy) to a Maximum Power Point Tracking (MPPT) device. The MPPT device may be a device to dynamically tune an output impedance of the connected power source (or energy source) so that output power of the power source is optimal and/or a maximum available power (from a harvester, for example) is outputted and delivered to a load.

The MPPT device may provide a power (or a voltage) to a voltage regulator based at least in part on the power provided by the alternative power source 20. The voltage regulator may provide a regulator output voltage to the electronic device 50.

As shown in FIG. 1, the electronic device 50 may include a battery charger 52, a voltage regulator (VR) 54, a load 56 and a battery 58 (such as in a battery port). The electronic device 50 may include other components, which may or may not be part of the load 56. Additional components may include, but are not limited to, a processor, a display, a speaker (or audio output device), a wireless communication device, a camera, a memory (or storage device), a microphone, etc. Other components and/or fewer components may also be provided.

The battery charger 52 may receive an input voltage (or input power). FIG. 1 shows that the battery charger 52 may receive power from either the alternative power source 10 (for the alternative power source 20) or the battery charger 52 may receive power from the DC power source 30. The battery charger 52 may also receive power from other types of power sources.

The battery charger 52 may provide an output voltage to a voltage regulator 54, for example. The voltage regulator 54 (of the electronic device 50) may provide an output voltage to the load 56. The voltage regulator 54 may provide a regulated output voltage to the load 56.

The battery charger 52 may also (or alternatively) provide an output voltage to the battery 58 (provided at a battery port of the electronic device 50). The battery 58 may be charged by the voltage received from the battery charger 52.

The battery charger 52 may provide an output voltage to the load 56 (via a voltage regulator 54) and/or the battery 58.

FIG. 1 shows use of an alternative power source (or alternative energy source). However, the received power and output voltage from the alternative power source 20 may not be stable.

FIG. 1 shows that different power sources may be used to power different types of electronic devices. However, an electronic device may not be compatible with an arbitrary power source, requiring instead an output voltage that is regulated within a certain percentage of a nominal value. Additionally, the power level of a power or energy source (or power supply) may have to be large enough to charge the battery as well as supply the load. However, certain requirements of the power source (or power supply) may make alternative power sources incompatible with different types of electronic devices.

For example, in at least one arrangement, a hybrid power delivery system may be provided to enable an electronic device (such as a mobile platform) to be powered with either a DC power supply or an alternative power source. In at least one arrangement, a plurality of battery chargers may be provided on a platform with a plurality of power source inputs.

Embodiments may provide a control mechanism (or control scheme) on power conversion distribution. Embodiments may provide a single power conversion. Embodiments may provide performance requirements of both the device/system (workload, charging) and the power source (power conditioning).

Figure 2:
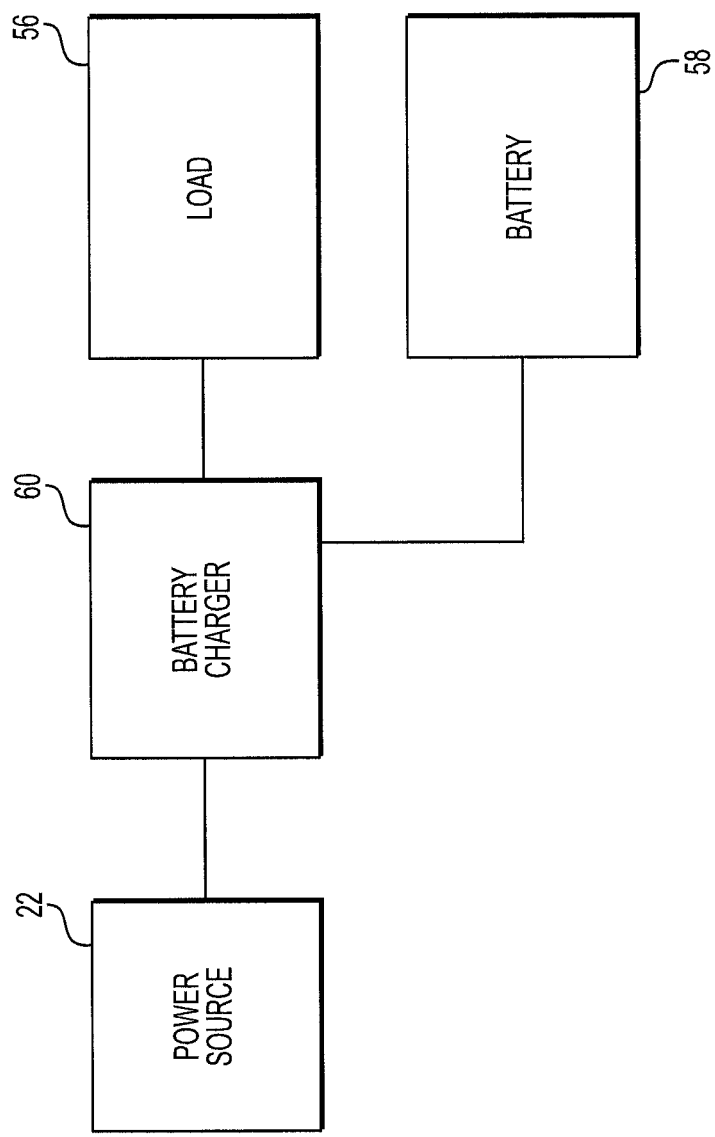
FIG. 2 is a diagram of components to charge a battery for an electronic device according to an example embodiment.

FIG. 2 is diagram of components to charge a battery for an electronic device according to an example embodiment. Other embodiments and configurations may also be provided.

FIG. 2 shows a power source 22 (or power supply), a battery charger 60, the load 56 (device or system) and the battery 58 (such as in a battery port). The power source 22 (FIG. 2) may represent any of a number of different power sources such as a direct current (DC) power source and/or an alternative power source, for example.

The battery charger 60 may perform various functions as will be described below relating to any of a number of different power sources. The battery charger 60 may be for use with any of a number of different power sources.

The load 56 may be an electronic device load (or an electronic system load). The load 56 and the battery 58 may correspond to the load and the battery shown in FIG. 1.

In at least one embodiment, the battery charger 60, the load 56 and the battery 58 may all be considered as part of an electronic device (or electronic system). The battery charger 60 may also be separate from (or external to) the electronic device (or electronic system).

Embodiments may provide only a single power conversion stage with a feedback control or multiple feedback controls. Control logic (or a control algorithm) may dynamically adapt to power characteristics of the power source and a demand of the load. Power distribution and partition may be self-configured and optimized even with different types of power sources (such as the DC power source or the alternative power source).

Embodiments may increase power conversion efficiency by using a single power stage rather than a plurality of power stages.

Embodiments may provide a single power stage (in hardware) by combining two distinct functions, namely power processing and voltage regulation. This may be better than arrangements having cascaded power conversions.

Embodiments may provide one of a plurality of operational modes (or states) based on different scenarios of power demands, battery charging status and/or different source. Electronic device/system operation parameters may be determined (with software/firmware) based on an application during run time.

Embodiments may provide critical performance requirements from the power source (e.g. impedance tuning), the battery (e.g. charging profile) and/or device/system load during operation with an adaptive control algorithm (and/or with logic, at least a portion of which is hardware).

Embodiments may power a load (system or device) and/or charge the battery regardless of a type of a power source connected to the electronic device, and thereby only depend on the power output of the power source. The control mechanism (or control algorithm) may dynamically adapt to a type of power source, such as a fixed DC voltage supply or a non-linear current-voltage (I-V) curve of the alternative energy source (such as a photovoltaic voltage (PV) harvested energy). An output voltage may be controlled or regulated at the device/system load or the battery, for example. Therefore, both power processing and battery charging may be performed by the battery charger 60 (shown in FIG. 2). As such, the battery charger 60 may be referred to as a general purpose battery charger and/or a universal battery charger.

Embodiments may provide a control mechanism (or control algorithm) that may adjust a single stage of power conversion such that the input power from the power source to the device or system may be optimized, while also satisfying device/system performance criteria on power/voltage/current.

FIG. 2 shows that an input of the battery charger 60 may be a power source with a fixed DC output voltage (such as from a DC power source) or a non-linear (or linear) current-voltage (I-V) profile (such as from an alternative power source). The power source may supply a limited energy (e.g. P_supply<P_demand) or have an excess power capacity.

Figure 3A:
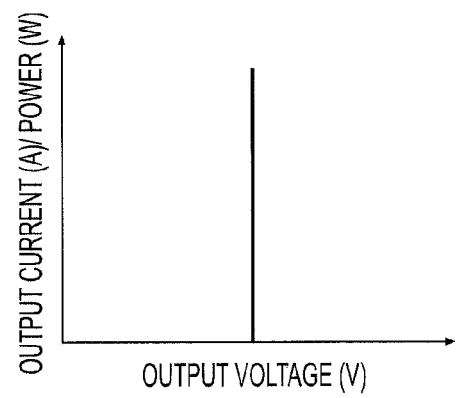
FIG. 3A is a graph showing characteristics of a DC power supply.

FIG. 3A shows characteristics of a DC power supply. For example, FIG. 3A shows a graph of an output voltage (V) versus an output current (A)/power (W) for a DC power source. As can be seen, the DC power source may be a fixed DC voltage. FIG. 3A shows the constant supply voltage of the DC power supply.

Figure 3B:
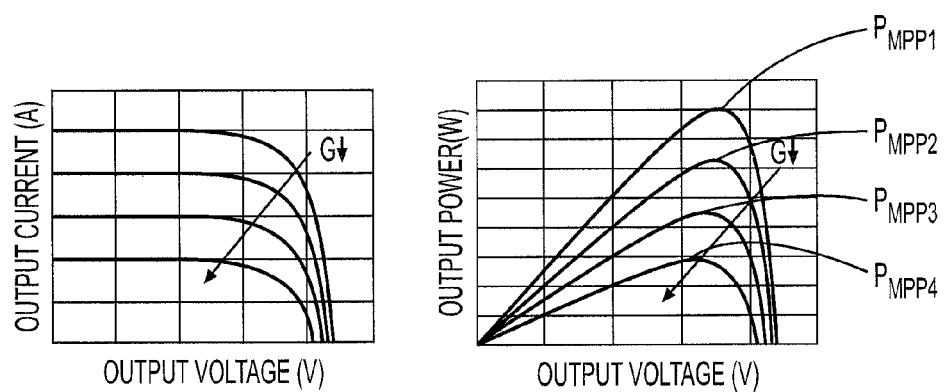
FIG. 3B is a graph showing characteristics of an alternative power source.

FIG. 3B shows characteristics of an alternative power source (or supply). For example, the left-hand graph of FIG. 3B shows an output voltage (V) versus an output current (A) and the right-hand graph of FIG. 3B shows an output voltage (V) versus an output power (W). While FIG. 3A shows a constant voltage supply for a DC power source, FIG. 3B shows a varying output voltage for an alternative power source.

FIG. 3B shows that an output current of an alternative power source may vary with its output voltage. This is in contrast to FIG. 3A that shows characteristics of a DC power source that may supply current at any given supply voltage. FIG. 3B further shows that the alternative power supply may supply a maximum power (Pmax) at a particular voltage and current, which may be defined as its maximum power point (MPP) depending on the input (light, mechanical motion, radio frequency (RF) energy and others), and that the power supplied by the alternative power source may drop significantly if the alternative power source is operated at a voltage or current different from its maximum power point MPP.

In previous arrangements in which the device/system is connected to a DC power source (or an AC grid through an AC/DC adaptor), then the electronic device (or system) may be sufficiently powered to supply the load and charge the battery at a same time.

However in arrangements in which the device/system is connected to the alternative power source, there may be a varying upper-bound in energy or power capacity of the alternative power source. For example, the graph in FIG. 3B shows that a PV power may be always less than or equal to a maximum power value (such as for solar power). FIG. 3B shows maximum powers as $P_{MPP}1$, $P_{MPP}2$, $P_{MPP}3$ and $P_{MPP}4$. The power output from the power source may vary from zero to $P_{MPP}$ (or Pmax) based on the operating voltage, the load current and etc. Additionally, the non-linearity of current-voltage I-V of the alternative power source may require a different design than of the DC power source.

Embodiments may power an electronic device (such as mobile platforms) using a DC power supply and/or a variable power source.

Figure 4:
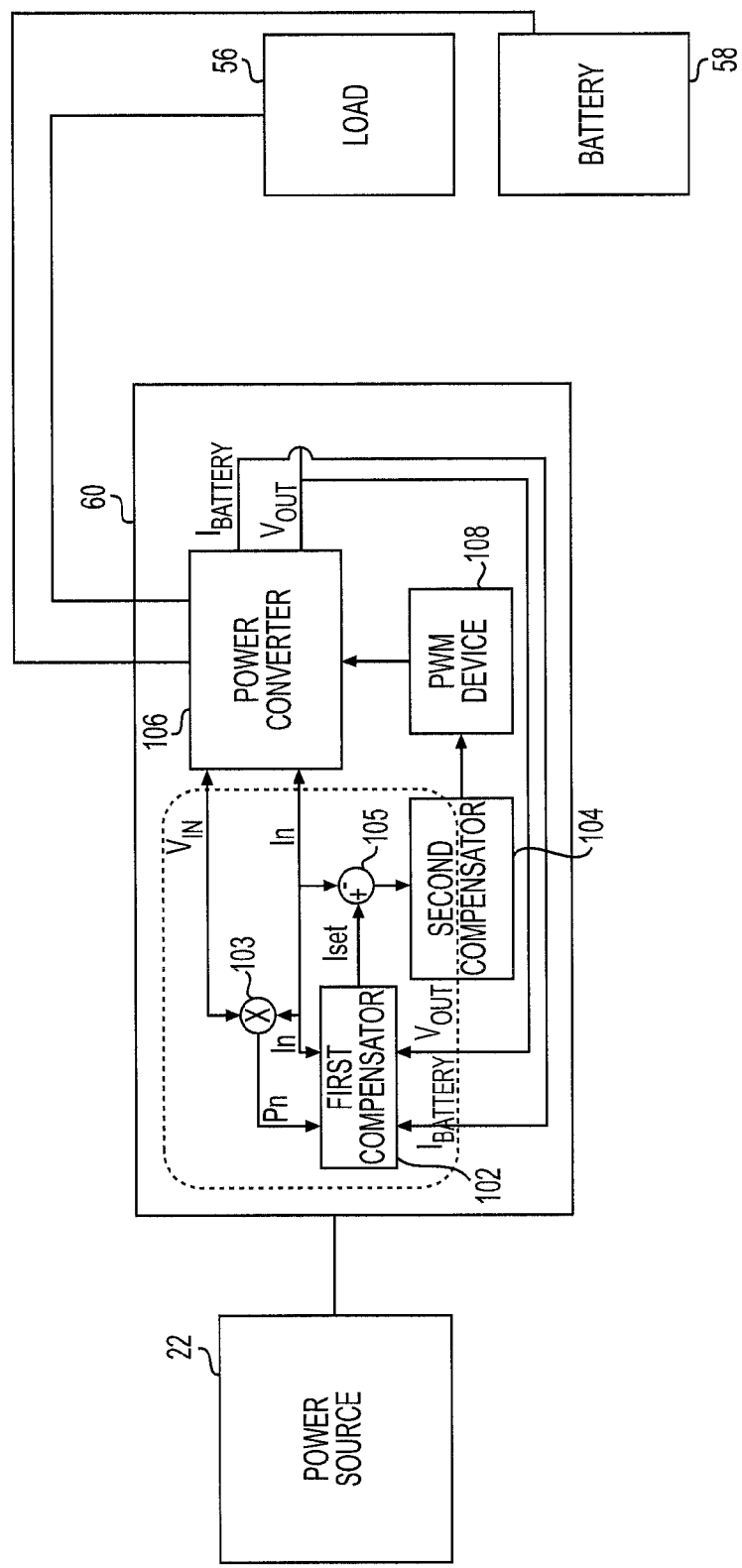
FIG. 4 is a diagram of a battery charger and other components according to an example embodiment.

FIG. 4 is a diagram of a battery charger and other components according to an example embodiment. Other embodiments and configurations may also be provided.

FIG. 4 shows that a power source 22 (such as a variable power source) may connect to an electronic device (or electronic system) with the load 56 and the battery 58, leveraging components such as a power converter 106, a pulse width modulation (PWM) device 108 (or pulse width generator) and a second compensator 104. Embodiments may provide a feedback control that is embedded and combined with the power converter 106 and the pulse width modulation device 108. Embodiments may include a first compensator 102 (or perturb & observe compensator) and a second compensator 104 (or PID compensator). These features may perform a closed loop control of stability and regulation, and also drive circuit performance such that the available power to the load is optimized (eg. MPPT).

The battery charger 60 may be provided within an electronic device, such as the electronic device 50 (of FIG. 1). Alternatively, the battery charger 60 may be provided external to an electronic device, such as the electronic device 50 (of FIG. 1).

In a similar manner as shown in FIG. 2, the power source 22 may provide power to the battery charger 60. The battery charger 60 may then operate and provide power to the load 56 and/or the battery 58. The power source 22 (FIG. 2) may represent any of a number of different power sources such as a direct current (DC) power source and/or an alternative power source, for example. The power converter 106 may provide first power to the load 56. The power converter 106 may provide second power to the battery 58. The first power may be similar to the second power. Alternatively, the first power may be different than the second power.

As shown in FIG. 4, the battery charger 60 may include the first compensator 102, the second compensator 104, the power converter 106, and the pulse width modulation (PWM) device 108.

The first compensator 102 may be called a perturb and observe compensator (or P&O compensator). The second compensator 104 may be a current feedback control compensator. The first compensator 102 may be a circuit or hardware entity, for example. The second compensator 104 may be a circuit or hardware entity, for example. Features of the first compensator 102 and/or the second compensator 104 may each be an algorithm (or software entity) that may run on a microprocessor, a digital signal processor (DSP), a microcontroller or a computer. Features of the first compensator 102 and/or the second compensator 104 may include logic, at least a portion of which is hardware.

The battery charger 60 may provide an adjustable current reference parameter, $I_{ref}$. The adjustable current reference parameter $I_{ref}$ may be generated from the first compensator 102. The adjustable current reference parameter $I_{ref}$ may be dynamically adjusted, in real time, based on run-time values of the input power as well as battery capacity.

An add-on element 105 may be a circuit element to connect features, such as the first compensator 102 and the second compensator 104 to a battery charger. The battery charger may attempt to regulate charging current to a given reference, which may depend on how much the battery may be charged, for example. The add-on element 105 may enable minimal modifications to a battery charger to achieve alternative power compatibility.

As shown, the power converter 106 may receive, from the device 103, an input voltage $V_{IN}$ (or input voltage value) and an input current $I_{IN}$ (or input current value). The input voltage $V_{IN}$ and the input current $I_{IN}$ may be actual real-time measured input voltage and current of the power converter 106. The power converter 106 may receive pulse width modulation from the pulse width modulation device 108 and thereby provide the output current $I_{battery}$ and the output voltage $V_{out}$. Output power may then be provided to the load 56 and/or the battery 58. A similar power may be provided to the load 56 and the battery 58. Alternatively, a different power may be provided to the load 56 and the battery 58.

The power converter 106 may include a DC/DC power stage with power sense elements. For example, the power converter 106 may include a power converter with voltage step-down, voltage step-up and/or Buck-Boost functionality, since there may be a wide range of voltage input from the power source.

The first compensator 102 may receive, such as feedback, the output voltage $V_{out}$ and the output current $I_{battery}$ from the power converter 106. The first compensator 102 may adapt an operational mode of the battery charger 60 based on the output voltage $V_{out}$ and the output current $I_{current}$. The first compensator 102 may change the mode of the battery charger 60.

The PWM device 108 may provide a pulse-width modulated signal to the power converter 106. The pulse-width modulated signal may be used by the power converter 106 to adjust the output current $I_{battery}$ and the output voltage $V_{out}$. The pulse width modulated signal (or signals) may drive the switches of a switching converter, for example, to achieve the output voltage Vout and the output current $I_{battery}$ in the output of the power converter 106.

The first compensator 102 may receive the output current $I_{battery}$ and the output voltage $V_{out}$ from the power converter 106. The power $P_{IN}$ and the current $I_{IN}$ that flows into the power converter 106 may be equal to (or same as) the power and the current of the input source (i.e., the alternative power source or the DC power source). The first compensator 102 may monitor these values to ascertain a corresponding or proper operation under the alternative power or energy source. The first compensator 102 may track the maximum power point MPP of the power source. The battery 58 may be charged based on the output current $I_{battery}$, which is current controlled so as to meet several criteria at a same time. Embodiments may satisfy the charging profile of a specific battery or a specific battery type while taking advantage of alternative power source or harvested energy source.

Embodiments may control a parameter or characteristic of the output power based on a type of power source coupled to the battery charger 60. For example, the first compensator 102 may output the current reference, $I_{ref}$, which may be continuously adjusted based on an amount of input power from the power source 22. This may achieve functionality of impedance matching (or maximum power point tracking) when the input of an alternative power source is provided (as the power source 22) or may be implemented through a stage of power conversion that exists in the battery charger 60. Accordingly, the plurality of power conversions may be provided at a single stage.

Embodiments may control and manage the device/system power distribution, voltage regulation and/or battery operation so as to avoid (or reduce) issues relating to power mismatch.

Figure 5A:
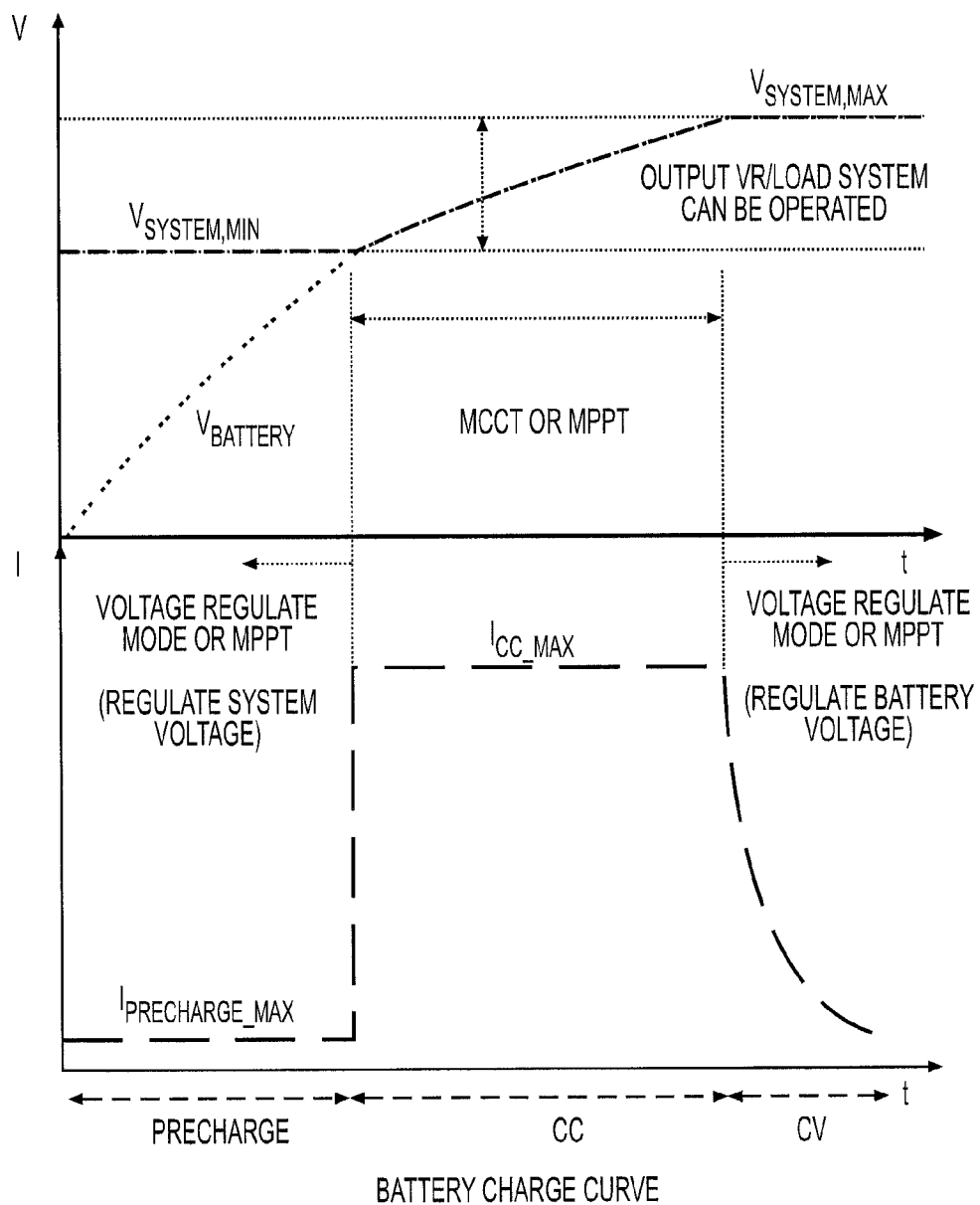
FIG. 5A shows different modes of power control according to an example embodiment.

FIG. 5A shows different modes of power control according to an example embodiment. Other embodiments and configurations may also be provided.

FIG. 5A is a graph showing voltage versus time (at a lower part of the figure) and a graph showing current versus time (at a higher part of the figure). The time axis (i.e., the y-axis) shows a precharge time period, a constant current (CC) time period and a constant voltage (CV) time period. These are respective time periods of the battery charger.

FIG. 5A show three distinct operation states (or modes) of the battery charger to cover different possible power scenarios of the electronic device. FIG. 5A shows a maximum power point tracking (MPPT) operational state, a maximum constant current tracking (MCCT) operational state and a voltage regulator (VR) operational state. The operational states may also be called modes.

The battery charger 60 may be provided in the MPPT (or maximum power point tracking) mode to obtain a maximum power from the input power source.

The battery charger 60 may be provided in the MCCT (or maximum constant current tracking) mode to perform the maximum charge current tracking when a capacity of the battery 58 is past the stage of a pre-charge but is not yet or is not yet close to a full charge (e.g. less than 90% of full capacity).

The battery charger 60 may be provided in the voltage regulation (VR) mode to handle situations in which a lower-bound voltage has to be maintained for the electronic device (i.e., a trickle charging of the battery), when the total available power from an input source could be smaller or larger than the load demand and/or the charging current. In this example, the power balance between a source and a load may be monitored, evaluated and adjusted in order to advance performance and maintain system stability and controllability.

Figure 5B:
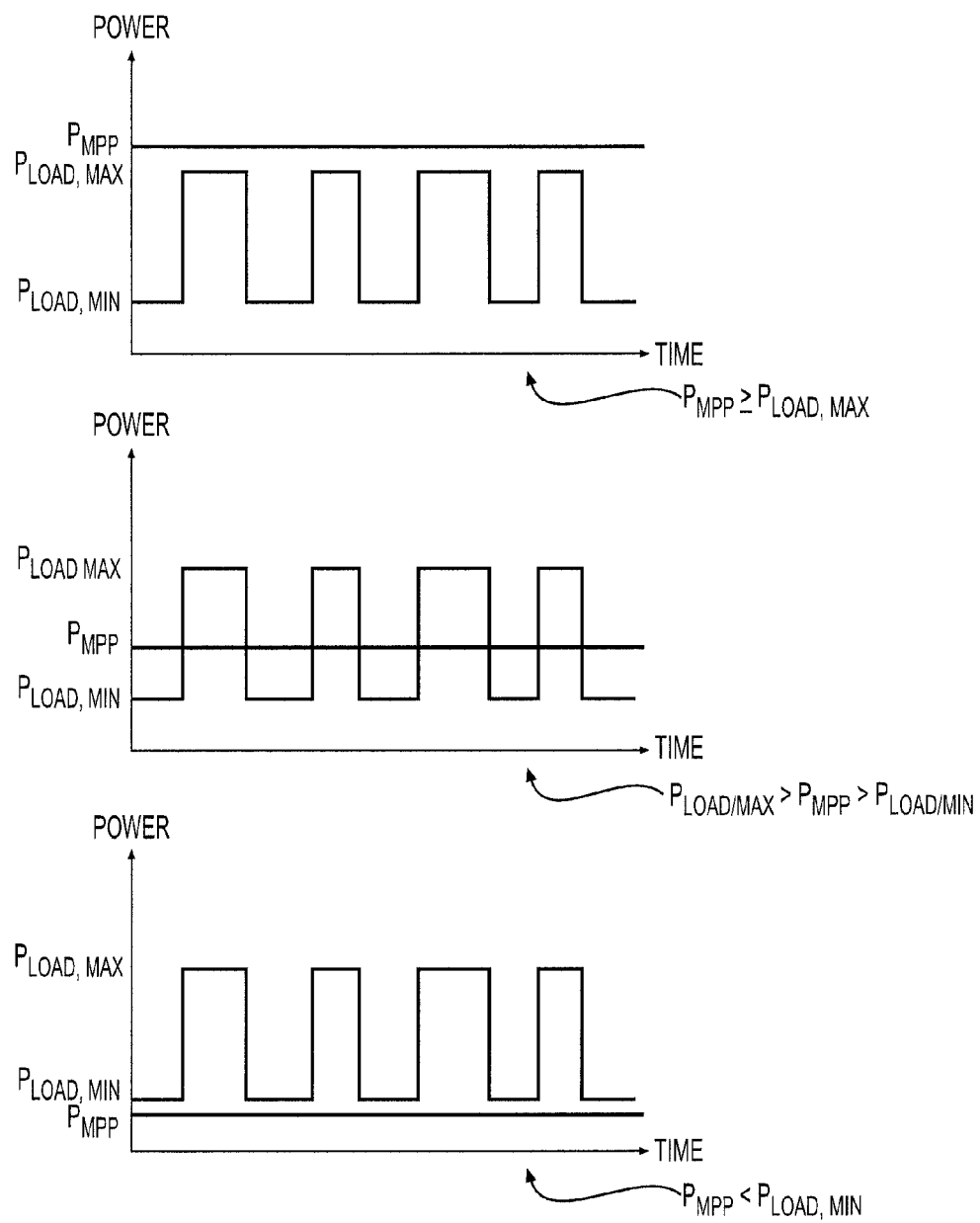
FIG. 5B shows different scenarios of relative power levels between a power source and a load according to an example embodiment.

FIG. 5B shows different scenarios of relative power levels between a power supply (or power source) and a load according to an example embodiment. Other embodiments and configurations may also be provided. For example, the different scenarios relate to power levels of the power source and the load.

In each of FIG. 5B, the graphs show power delivery and supply versus time. In the top graph, a $P_{MPP}$ is greater than the highest power demand from the load Pload, max. In the middle graph, Pload, max is greater than $P_{MPP}$, which is greater than the minimum power drawn by the load over time, Pload, min. In the bottom graph, Pmpp is less than Pload, min. The conditions shown in FIG. 5B show possibilities of input and output power that the control logic (or circuits) may adapt to, while still maintaining optimal power transfer and battery charging while keeping the load supplied with a proper voltage.

The following may relate to an algorithm that may be performed based on the battery charger 60.

$$B = (I_{in\_}k+1 < I_{in\_}k)$$

$$XOR(P_{in\_}k+1 > P_{in\_}k)$$

$$XOR((I_{\_battery\_}k+1 > I\_max)$$

$$OR(V\_out\_k+1 > V\_max))$$

if B=1, $I_{ref\_}$k+1=Iref_k+ΔI, increase current, a control variable;

if B=0, $I_{ref\_}$k+1=Iref_k−ΔI, Decrease current, a control variable.

As in the above-described equation, B may represent a Boolean value. In this equation; k, k+I may indicate sequential values; $I_{in}$ may represent the current of the input power source; Pin may represent the power of the input power source; V_out may represent the voltage output of the battery charger; and I_battery may represent the charging (+) or discharging (−) current from the battery.

Both the maximum charging current, I_max, and the maximum voltage, V_max, may be adjusted during operation of the battery charger based on battery status (and energy capacity).

In the above described equation, ΔI may represent the current step, which may be a fixed value or a variable.

As an example, when the electronic device shows a decrease in the input current ($I_{in\_}$k+1 < $I_{in\_}$k) and an increase in the input power ($P_{in\_}$k+I > $P_{in\_}$k) while maintaining the condition of charging current and voltage at the battery below its limits, ($I_{\_Battery} < I_{max}$), $N_{out} < V_{max}$), then the battery charger (or control logic) may decrease the value of $I_{ref}$(B=0). In another example, when the electronic device (or system) is not drawing current and its battery is charged almost fully, while the input alternative power source is capable of providing excess power, then the control logic (or circuits) may change the value of Iref to a trickle-charge current of the battery. Thus, the battery may operate under the specified pre-charge mode under a controlled and relevant low input current.

Figure 6:
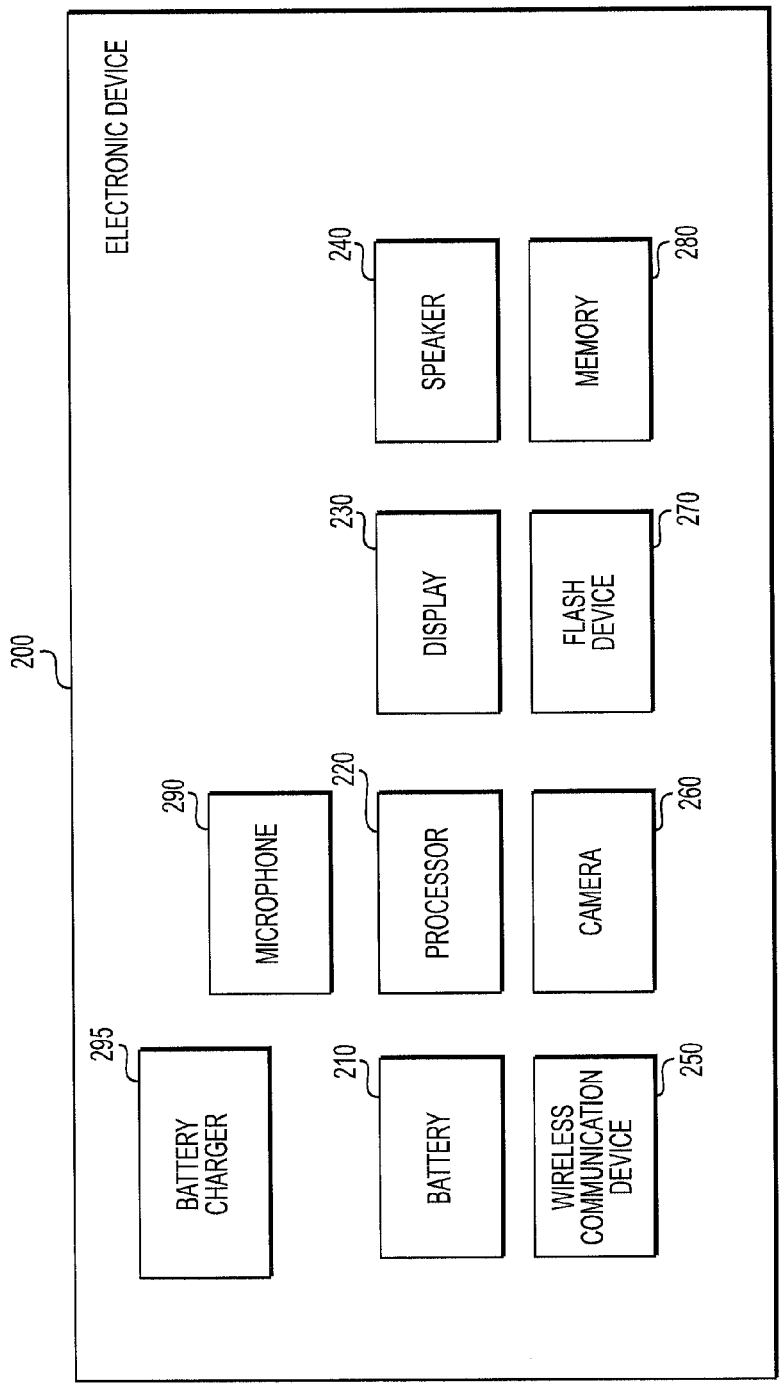
FIG. 6 shows an electronic device according to an example embodiment.

FIG. 6 shows an electronic device according to an example embodiment. Other embodiments and configurations may also be provided.

More specifically, FIG. 6 shows an electronic device 200 that may include any of the features, elements or operations discussed above. The electronic device 200 shown in FIG. 6 may correspond, in whole or in part, to the electronic device 50 shown in FIG. 1 and/or features of the other figures. More or less components may also be provided.

FIG. 6 shows that the electronic device 200 may include a battery 210, a processor 220, a display 230, a speaker 240, a wireless communication device 250, a camera 260, a flash device 270, a memory 280, a microphone 290 and a battery charger 295.

The processor 220 may perform operations discussed above by using instructions received, such as via a computer-readable medium.

FIG. 6 shows the battery charger 295 inside the electronic device 200. However, the battery charger 295 may also be provided outside the electronic device 200. The battery charger 295 may perform operations discussed above (with regard to the above described battery charger).

Figure 7:
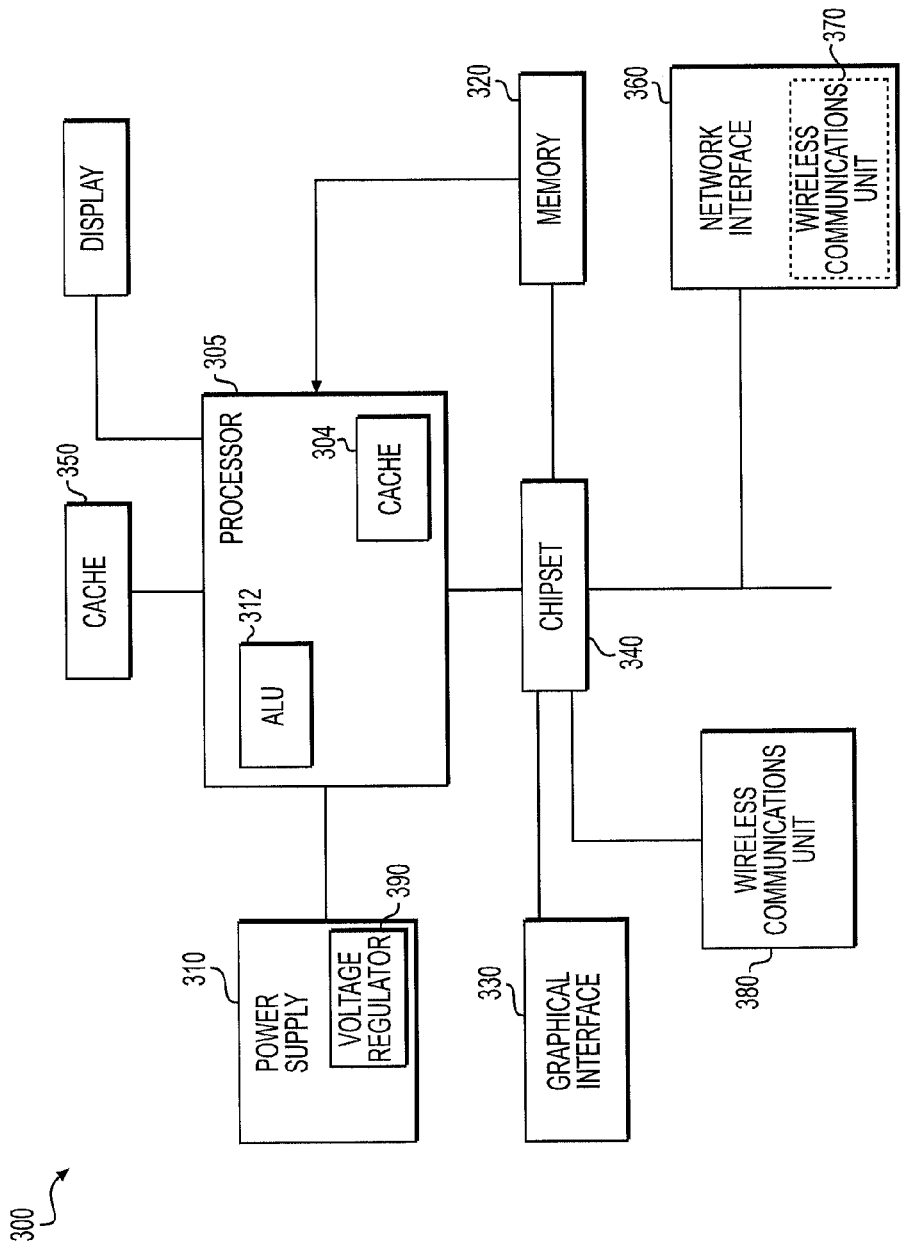
FIG. 7 shows an electronic system according to an example embodiment.

FIG. 7 shows an electronic system according to an example embodiment. Other embodiments and configurations may also be provided.

More specifically, FIG. 7 shows a system 300 that includes a processor 305, a power supply 310 and a memory 320, which may be a random access memory, for example. The processor 305 may include an arithmetic logic unit 312 and an internal cache 304, for example. The processor 305 may perform operations discussed above by using the instructions received, such as via a computer-readable medium.

The system 300 may also include a graphical interface 330, a chipset 340, a cache 350, a network interface 360 and a wireless communication unit 370, which may be incorporated within the network interface. Alternatively or additionally the communications unit 380 may be coupled to the processor 305, and a direct connection may exist between the memory 320 and the processor 305.

The processor 305 may be a central processing unit, a microprocessor or any other type of processing or computing circuit and may be included on a chip die with all or any combination of the remaining features, or one or more of the remaining features may be electrically coupled to the microprocessor die through known connections and interfaces. Also, the connections that are shown are merely illustrative as other connections between or among the elements depicted may exist depending, for example, on chip platform, functionality, or application requirements.

In at least one embodiment, a computer-readable medium (or machine-readable medium) may store a program for controlling circuitry or logic of a battery charger. The program may be stored in a system memory, which for example, may be internal or external to the electronic device. In at least one embodiment, the program may be part of a control algorithm for controlling operations of the battery charger.

Instructions or code executed by a processor, for example, may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Example 1 is an electronic apparatus comprising a charger to determine a type of power source to couple to the charger, and to adjust power from the power source based on the determined type of the power source.

In Example 2, the subject matter of Example 1 can optionally include that the charger to change an impedance of the power based on the determined type of power source.

In Example 3, the subject matter of Example 1 can optionally include that the charger to perform power processing of the power based on the determined type of power source.

In Example 4, the subject matter of Example 1 can optionally include that the charger to determine a specific mode of the charger.

In Example 5, the subject matter of Example 1 and Example 4 can optionally include that the specific mode is one of a maximum power point tracking (MPPT) mode, a maximum constant current tracking (MCCT) mode and a voltage regulator mode.

In Example 6, the subject matter of Example 1 and Example 4 can optionally include that the charger to determine the specific mode of the charger based on power demand.

In Example 7, the subject matter of Example 1 and Example 4 can optionally include that the charger to determine the specific mode of the charger based on a status of battery charging.

In Example 8, the subject matter of Example 1 can optionally include that the type of power source is a direct current (DC) power source or an alternative power source.

In Example 9, the subject matter of Example 1 and Example 8 can optionally include that the alternative power source is one of a solar power source, a mechanical power source, a photovoltaic power source, a thermal power source, a radio frequency power source, a vibration power source, biomechanical power source or a fuel cell.

Example 10 is an electronic apparatus comprising: logic, at least a portion of which is hardware, to determine a type of power source, and to adjust power from the power source based on the determined type of the power source.

In Example 11, the subject matter of Example 10 can optionally include that the logic to change an impedance of the power based on the determined type of power source.

In Example 12, the subject matter of Example 10 can optionally include that the logic to perform power processing of the power based on the determined type of power source.

In Example 13, the subject matter of Example 10 can optionally include that the logic to determine a specific mode.

In Example 14, the subject matter of Example 10 and Example 13 can optionally include that the specific mode is one of a maximum power point tracking (MPPT) mode, a maximum constant current tracking (MCCT) mode and a voltage regulator mode.

In Example 15, the subject matter of Example 10 and Example 13 can optionally include that the logic to determine the specific mode based on power demand.

In Example 16, the subject matter of Example 10 and Example 13 can optionally include that the logic to determine the specific mode based on a status of battery charging.

In Example 17, the subject matter of Example 10 can optionally include that the type of power source is a direct current (DC) power source or an alternative power source.

In Example 18, the subject matter of Example 10 and Example 17 can optionally include that the alternative power source is one of a solar power source, a mechanical power source, a photovoltaic power source, a thermal power source, a radio frequency power source, a vibration power source, biomechanical power source or a fuel cell.

Example 19 is an electronic system comprising a load, a processor to perform an operation on the load, a battery port to receive a battery, and a charger to determine a type of power source, and to adjust power from the power source based on the determined type of the power source.

In Example 20, the subject matter of Example 19 can optionally include that the charger to provide power to the load.

In Example 21, the subject matter of Example 19 can optionally include that the charger to provide power to the battery.

In Example 22, the subject matter of Example 19 can optionally include that the charger to change an impedance of the power based on the determined type of power source.

In Example 23, the subject matter of Example 19 can optionally include that the charger to perform power processing of the power based on the determined type of power source.

In Example 24, the subject matter of Example 19 can optionally include that the charger to determine a specific mode of the charger.

In Example 25, the subject matter of Example 19 and Example 24 can optionally include that the specific mode is one of a maximum power point tracking (MPPT) mode, a maximum constant current tracking (MCCT) mode and a voltage regulator mode.

In Example 26, the subject matter of Example 19 and Example 24 can optionally include that the charger to determine the specific mode of the charger based on power demand.

In Example 27, the subject matter of Example 19 and Example 24 can optionally include that the charger to determine the specific mode of the charger based on a status of battery charging.

In Example 28, the subject matter of Example 19 can optionally include that the type of power source is a direct current (DC) power source or an alternative power source.

In Example 29, the subject matter of Example 19 and Example 28 can optionally include that the alternative power source is one of a solar power source, a mechanical power source, a photovoltaic power source, a thermal power source, a radio frequency power source, a vibration power source, biomechanical power source or a fuel cell.

Example 30 is an electronic apparatus comprising: first means for determining a type of power source to couple to the electronic apparatus, and second means for adjusting power from the power source based on the determined type of the power source.

In Example 31, the subject matter of Example 30 can optionally include that the second means to change an impedance of the power based on the determined type of power source.

In Example 32, the subject matter of Example 30 can optionally include that the second means to perform power processing of the power based on the determined type of power source.

In Example 33, the subject matter of Example 30 can optionally include that the second means to determine a specific mode.

In Example 34, the subject matter of Example 30 and Example 33 can optionally include that the specific mode is one of a maximum power point tracking (MPPT) mode, a maximum constant current tracking (MCCT) mode and a voltage regulator mode.

In Example 35, the subject matter of Example 30 and Example 33 can optionally include that the second means to determine the specific mode based on power demand.

In Example 36, the subject matter of Example 30 and Example 33 can optionally include that the second means to determine the specific mode based on a status of battery charging.

In Example 37, the subject matter of Example 30 can optionally include that the type of power source is a direct current (DC) power source or an alternative power source.

In Example 38, the subject matter of Example 30 and Example 37 can optionally include that the alternative power source is one of a solar power source, a mechanical power source, a photovoltaic power source, a thermal power source, a radio frequency power source, a vibration power source, biomechanical power source or a fuel cell.

Example 39 is a machine-readable medium comprising one or more instructions that when executed cause a device to perform one or more operations to: determine a type of power source, and adjust power from the power source based on the determined type of the power source.

In Example 40, the subject matter of Example 39 can optionally include that the one or more instructions to adjust power by changing an impedance of the power based on the determined type of power source.

In Example 41, the subject matter of Example 39 can optionally include that the one or more instructions to adjust power by performing power processing of the power based on the determined type of power source.

In Example 42, the subject matter of Example 39 can optionally include one or more instructions that when executed to determine a specific mode.

In Example 43, the subject matter of Example 39 and Example 42 can optionally include that the specific mode is one of a maximum power point tracking (MPPT) mode, a maximum constant current tracking (MCCT) mode and a voltage regulator mode.

In Example 44, the subject matter of Example 39 and Example 42 can optionally include that the one or more instructions to determine the specific mode based on power demand.

In Example 45, the subject matter of Example 39 and Example 42 can optionally include that the one or more instructions to determine the specific mode based on a status of battery charging.

In Example 46, the subject matter of Example 39 can optionally include that the type of power source is a direct current (DC) power source or an alternative power source.

In Example 47, the subject matter of Example 39 and Example 46 can optionally include that the alternative power source is one of a solar power source, a mechanical power source, a photovoltaic power source, a thermal power source, a radio frequency power source, a vibration power source, biomechanical power source or a fuel cell.

Example 48 is a method of an electronic apparatus comprising determining a type of power source to couple to the electronic apparatus; and adjusting power from the power source based on the determined type of the power source.

In Example 49, the subject matter of Example 48 can optionally include that adjusting the power includes changing an impedance of the power based on the determined type of power source.

In Example 50, the subject matter of Example 48 can optionally include that adjusting the power includes performing power processing of the power based on the determined type of power source.

In Example 51, the subject matter of Example 48 can optionally include determining a specific mode of a charger.

In Example 52, the subject matter of Example 48 and Example 51 can optionally include that the specific mode is one of a maximum power point tracking (MPPT) mode, a maximum constant current tracking (MCCT) mode and a voltage regulator mode.

In Example 53, the subject matter of Example 48 and Example 51 can optionally include that determining the specific mode includes determining the specific mode based on power demand.

In Example 54, the subject matter of Example 48 and Example 51 can optionally include that determining the specific mode includes determining the specific mode based on a status of battery charging.

In Example 55, the subject matter of Example 48 can optionally include that the type of power source is a direct current (DC) power source or an alternative power source.

In Example 56, the subject matter of Example 48 and Example 55 can optionally include that the alternative power source is one of a solar power source, a mechanical power source, a photovoltaic power source, a thermal power source, a radio frequency power source, a vibration power source, biomechanical power source or a fuel cell.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic apparatus comprising:
a charger to determine a type of power source to couple to the charger, and to adjust power from the power source by the charger to change an impedance of the power based on the determined type of power source, wherein the charger to determine a specific first one of a plurality of modes of the charger based on power demand, and the charger to determine a specific second one of the plurality of modes of the charger based on a status of battery charging, wherein the specific first one of the modes is a voltage regulator mode.

2. The electronic apparatus of claim 1, wherein the charger to perform power processing of the power based on the determined type of power source.

3. The electronic apparatus of claim 1, wherein the plurality of modes of the charger include a maximum power point tracking (MPPT) mode, a maximum constant current tracking (MCCT) mode and the voltage regulator mode.

4. The electronic apparatus of claim 1, wherein the type of power source is a direct current (DC) power source or an alternative power source.

5. The electronic apparatus of claim 4, wherein the alternative power source is one of a solar power source, a mechanical power source, a photovoltaic power source, a thermal power source, a radio frequency power source, a vibration power source, biomechanical power source or a fuel cell.

6. An electronic apparatus comprising:
logic, at least a portion of which is hardware, to determine a type of power source, and to adjust power from the power source by the logic to change an impedance of the power based on the determined type of power source, wherein the logic to determine a specific first one of a plurality of modes based on power demand, and the charger to determine a specific second one of the plurality of modes based on a status of battery charging, wherein the specific first one of the modes is a voltage regulator mode.

7. The electronic apparatus of claim 6, wherein the logic to perform power processing of the power based on the determined type of power source.

8. The electronic apparatus of claim 6, wherein the type of power source is a direct current (DC) power source or an alternative power source.

9. A machine-readable medium comprising one or more instructions that when executed cause a device to perform one or more operations to:
determine a type of power source,
adjust power from the power source by change of an impedance of the power based on the determined type of power source;
determine a specific first one of a plurality of modes based on power demand; and
determine a specific second one of the plurality of modes based on a status of battery charging, wherein the specific first one of the modes is a voltage regulator mode.

10. The machine-readable medium of claim 9, wherein the one or more instructions to adjust power by performing power processing of the power based on the determined type of power source.

11. The machine-readable medium of claim 9, wherein the specific second one of the modes is a maximum constant current tracking (MCCT) mode.

12. The electronic apparatus of claim 1, wherein the specific second one of the modes is a maximum constant current tracking (MCCT) mode.

13. The electronic apparatus of claim 6, wherein the specific second one of the modes is a maximum constant current tracking (MCCT) mode and a voltage regulator mode.

* * * * *